US007561039B2

(12) United States Patent
Nordevall et al.

(10) Patent No.: US 7,561,039 B2
(45) Date of Patent: Jul. 14, 2009

(54) TRANSMITTING UNIT

(75) Inventors: Lennart Nordevall, Jonkoping (SE); Stefan Andersson, Huskvarna (SE)

(73) Assignee: SAAB AB, Linköping (SE)

( * ) Notice: Subject to any disclaimer, the term of this patent is extended or adjusted under 35 U.S.C. 154(b) by 467 days.

(21) Appl. No.: 11/164,183

(22) Filed: Nov. 14, 2005

(65) Prior Publication Data
US 2006/0103567 A1 May 18, 2006

(30) Foreign Application Priority Data
Nov. 15, 2004 (EP) .................................. 04027086

(51) Int. Cl.
G08B 1/00 (2006.01)
G08B 5/22 (2006.01)
G08B 23/00 (2006.01)
H04B 10/00 (2006.01)

(52) U.S. Cl. .............................. 340/539.13; 340/539.1; 340/825.36; 340/825.72; 340/573.1; 340/573.4; 398/115; 398/118; 398/127; 398/130; 398/151

(58) Field of Classification Search ....................... None
See application file for complete search history.

(56) References Cited

U.S. PATENT DOCUMENTS

| | | | | |
|---|---|---|---|---|
| 5,541,585 A | * | 7/1996 | Duhame et al. ............ 340/5.62 |
| 5,636,597 A | * | 6/1997 | Van Curen et al. .......... 119/720 |
| 5,727,758 A | * | 3/1998 | Penza et al. .................. 246/124 |
| 5,917,425 A | * | 6/1999 | Crimmins et al. ....... 340/825.49 |
| 6,114,990 A | * | 9/2000 | Bergljung et al. ....... 342/357.09 |
| 6,216,087 B1 | | 4/2001 | Want et al. |
| 6,276,814 B1 | | 8/2001 | Gough |
| 6,912,475 B2 | * | 6/2005 | Moriya et al. ................ 702/150 |
| 2001/0009407 A1 | * | 7/2001 | Honda et al. ........... 342/357.09 |
| 2001/0029011 A1 | * | 10/2001 | Dagani et al. .................. 434/11 |
| 2005/0046577 A1 | * | 3/2005 | Koiso et al. .............. 340/573.4 |
| 2005/0140547 A1 | * | 6/2005 | Rosenfeld .................... 342/417 |
| 2005/0200453 A1 | * | 9/2005 | Turner et al. ................ 340/5.61 |
| 2007/0197262 A1 | * | 8/2007 | Smith et al. .............. 455/562.1 |
| 2008/0061962 A1 | * | 3/2008 | Campman .............. 340/539.13 |

FOREIGN PATENT DOCUMENTS

DE 198 38 902 A1 * 3/2000
WO WO 97/35208 9/1997

* cited by examiner

*Primary Examiner*—Julie Lieu
(74) *Attorney, Agent, or Firm*—Venable LLP; Eric J. Franklin

(57) ABSTRACT

A transmitting unit includes a transmitter for transmitting signals of coded information about a position close to the unit in a space substantially unreachable by a satellite-based navigating system so as to provide a receiver arranged on a moving object present in the space with the position information for determining the position of the object. The transmitter is adapted to normally be in an inactive non-transmitting state, and the unit further includes a detector adapted to detect movement of an object within a space and activate the transmitter to transmit signals only when movement of an object in the space is detected.

19 Claims, 3 Drawing Sheets

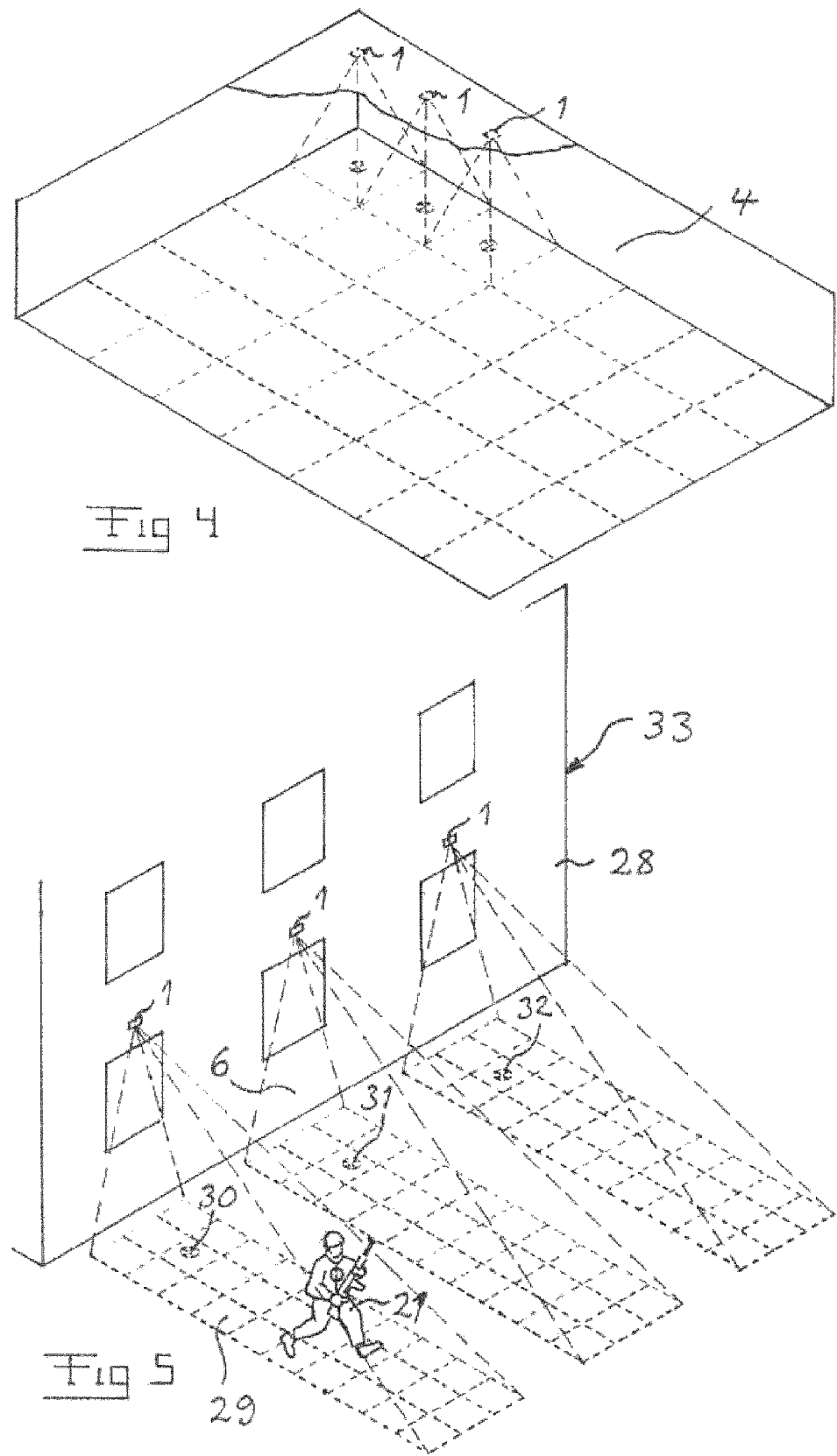

TRANSMITTING UNIT

TECHNICAL FIELD OF THE INVENTION

The present invention relates to transmitting units. More specifically, the invention relates to transmitting units arranged to transmit signals containing position information.

BACKGROUND OF THE INVENTION

Transmitting units are known through, for instance, WO 97/35208 and U.S. Pat. No. 5,917,425. Although there are known transmitting units and they can function well for some applications, there are certain uses and circumstances where it would be an advance in the art to provide improved transmitting units.

U.S. Pat. No. 6,276,814 concerns a lighting appliance having a movement sensor. Such an appliance might be useful in new applications, if suitable improvements and alterations could be made to make it better related to specific conditions.

The present invention therefore relates to a transmitting unit having a transmitter for transmitting signals of coded information about a position close to the unit in a space which may be substantially unreachable by a satellite-based navigating system so as to provide a receiver arranged on a moving object, such as a person, present in the space with this position information for determining the position of this object. Thus, the transmitter provides position information even in spaces unreachable by a satellite based navigation system but can with advantage also be used in spaces reachable by a satellite-based navigating system.

The object in question may be of any type able to move, such as a living being or even any type of robot, vehicle or the like. However, the case of such an object in the form of a human being, i.e. a person, will hereinafter be discussed for simplifying the explanation of the invention.

The space may be a room in a building or any other space substantially unreachable by a satellite-based navigating system, such as a space outdoors close to a building, in a mountain region, in any type of cave or tunnel or the like. Although not necessary, the person may also be provided with a transmitter sending position information further to any type of central unit registering and processing this information, possibly together with position information about other persons and/or about the environment in which the person is moving. In the case of a space in the form of a room in a building the position information may consist of information about in which building, in which floor and in which room the person is present.

According to the invention, a plurality of such transmitting units may be arranged in different spaces located close to each other, such as in different rooms in a building, or even in the same room thereof. It is not necessary that in such a case all the transmitting units are arranged in a space substantially unreachable by a satellite-based navigating system, but some of them may be arranged in a space well reachable by such a system.

Such an inventive transmitting unit may be arranged for assigning position information to a person for many different purposes, and some of them may be mentioned here as a not exhausting listing of examples. Transmitting units of this type may be used for assigning fire fighters position information for by a communication and/or managing centre assist the fire fighters to find their way and/or to make it possible to find a fire fighter needing help. Another possibility is to have such transmitting units in different rooms of museums and provide the visitors with a receiver for making it possible to provide each visitor with information associated with the instantaneous location of the visitor.

However, for the purpose of illuminating but not in any way restricting the present invention, the application of such a transmitting unit to a military exercise of combat in an area having at least any space substantially unreachable by a satellite-based navigating system will hereinafter be described. In the case of a military exercise of combat in buildings at least one transmitting unit of this type may be arranged in each room of a building in which a soldier may be present. The transmitters of the transmitting units known are then continuously transmitting signals of coded position information, such as infrared light pulses, out into the room. When a soldier is located in the room the receiver on the soldier will receive these pulses and after some processing transmit them further to a central unit for governing the military exercise, so that this central unit always knows where the different soldiers participating in the exercise are located. This means a possibility to make the military exercise realistic in the sense that the influence of different weapons upon the state of the soldiers may be the same as in a real combat. When for instances a hand-grenade is thrown through a window and into a room in a building the persons located in the room may be considered to be dead or hurt. Similar conclusions may be drawn when a building is considered to be partly or totally destroyed by a grenade or if any type of gas creating any type of condition of a soldier is supplied to any particular room. Such a military exercise may of course also take place partly in open areas, such as between buildings, in ditches and the like.

SUMMARY OF THE INVENTION

The object of the present invention is to provide a transmitting unit of the type outlined above.

This object is according to the invention obtained by providing such a transmitting unit in which the transmitter is adapted to normally be in an inactive non-transmitting state, and in which means are arranged to detect movement of an object within a space and activate the transmitter to transmit signals only when a movement of the object in the volume is detected.

By using such a detection of movement within the space, the transmitter will only transmit signals of coded information when there is a real need to do so, so that the power consumption of the transmitting unit may be considerably reduced and the intervals between replacement of batteries of the transmitting unit may be remarkably prolonged with respect to such transmitting units already known transmitting continuously, at least as long as a military exercise or any other event is going on. This means a considerable saving of cost, especially when a great number of such transmitting units are used simultaneously. In fact, it is mostly difficult and in some cases even impossible to stop transmission of transmitting units already known when they are stored, and except for the high energy consumption this also requires a shielding of the receivers when stored close thereto for preventing them to continuously decode the signals received. Furthermore, the active duty cycle for the components of the transmitting unit will be short resulting in a lower cost for these components.

The detecting means is adapted to detect movement of an object only within a restricted predefined volume of the space. By restricting the detection volume, the power consumption of the transmitting unit may be reduced further. This feature of the transmitting unit also means that an object, such as a person, present in the space will not receive signals from the transmitter all the time, but only when the person moves within the restricted predefined volume. This means a saving of power also in the equipment of the person, since each time the receiver receives signals this equipment has to evaluate these signals, which is associated with a consumption of power. Unnecessary such evaluations may by this embodiment of the present invention be eliminated or at least drastically reduced. This also means a possibility to provide position information with a higher accuracy when desired, since the detecting zone of the restricted predefined volume of the space may be much smaller than for instance a room of a building. Accordingly, a plurality of positions in a room may by this be used if desired.

According to another preferred embodiment of the invention the transmitter is adapted to transmit signals of coded information within a restricted predefined volume of the space. This involves a possibility to transmit signals only where it is interesting to provide a person (hereinafter "person" is used for "object") with signals of coded position information, so that the receiver of the person will substantially only receive such signals requiring evaluation when there is a need thereof.

According to a preferred embodiment of the invention the transmitter and the detecting means are matched so that the restricted predefined volumes of transmitting and detection substantially coincide. This means a possibility of further reduction of power consumption and efficiency of the transmitting unit, since the transmitting is directed to the place where a movement has been detected and accordingly a receiver for receiving signals is located.

According to another preferred embodiment of the invention the detecting means comprises a member adapted to detect infrared radiation. This is particularly suitable when the object is a person or another living being continuously emitting infrared radiation, so that the person then does not need any particular transmitter for being detected. This detecting member is then preferably of pyro-electric type.

According to a preferred embodiment of the invention the detecting means comprises a Fresnel lens designed to define the restricted predefined volume of the space for detection by the detecting means. Such a lens may easily be designed to define exactly the volume of the space aimed at. This volume may according to another preferred embodiment of the invention be formed by one or more curtain-like volumes. This means for example a possibility to provide a curtain-like detecting volume covering an opening, such as a door opening or a window, into a room, so that signals will be transmitted when a person enters the room, but not when the person is moving inside the room.

According to another preferred embodiment of the invention the detecting means is adapted to detect movement of a the object within a restricted predefined volume of the space in the form of one or more pyramid-like or cone-like volumes diverging from a detecting member of the detecting means. This type of detecting volumes may be preferred in some particular applications.

According to another preferred embodiment of the invention the detecting means comprises a detecting member able to determine in which direction an object moves within the space. This may for instance be achieved by arranging two detecting members of pyro-electric type delivering together a detection signal with a shape dependent upon in which direction the person is moving. In the case of detection within a restricted predefined volume it may in this way be determined in which direction a person is crossing this volume.

According to a further development of the embodiment last mentioned the transmitting unit comprises a processing device adapted to receive a detection signal from the detecting member and control the transmitter in dependence of the character of this signal for making one or both of the following decisions a) and b) dependent upon the detected direction of movement of the object:

a) about which of two or more positions signals of coded information is to be transmitted by the transmitter, b) whether the transmitter shall transmit signals of coded information or not.

In the first case (a) one transmitting unit may in this way be used for "covering" two spaces and provide the receiver of a person with position information associated with one of these spaces dependent upon in which direction the person is moving in the detection volume of the detecting member. This feature may be used to improve the position accuracy of an overall system to which the transmitting unit belongs or to reduce the number of transmitting units necessary in such a system for obtaining predetermined position accuracy. In the second case (b) a further saving of power consumption of both the transmitter of the transmitting unit and the equipment of the person is possible by only transmitting the signals when the person enters the space and not when the person leaves the space in question.

According to another preferred embodiment of the invention the transmitter is adapted to enter an inactive state after having transmitted a predetermined amount of the signals of coded information upon a detection of a movement of an object by the detecting means for saving power.

According to another preferred embodiment of the invention the transmitter comprises a source supplying energy for the generation of the signals of coded information, and this energy source is normally in an inactive energy storing state and adapted to be activated by a detection of a movement of the object by the detecting means for delivering energy for the generation of signals of coded information. This energy source may for instance provide a sufficient voltage for generating pulses to be transmitted by the transmitter. Power may be saved by normally keeping this energy source in an inactive energy storing state.

According to another preferred embodiment of the invention the transmitter comprises an arrangement of one or more lenses adapted to form a beam of transmitted signals defining a restricted predefined volume for transmitting. The advantages of such a directed transmission appear from above.

According to another preferred embodiment of the invention the transmitter is adapted to transmit signals of coded information in the form of pulses of infrared light, and mechanical means are preferably arranged around the transmitter for shielding it. The combination of the arrangement of such mechanical shielding means and a transmission being restricted in volume and to time periods when a movement of a person is detected results in a remarkable reduction of betraying transmission signals with respect to prior art transmitting units transmitting continuously over a large area and without any shielding.

According to another preferred embodiment of the invention the transmitting unit comprises a processing device adapted to process detected signals and control the transmitting of signals by the transmitter, and this processing device is provided with a wireless interface for updating of the coded position information and/or a computer program contained therein. This makes it possible to easily move a transmitting unit from one location to another for a new application thereof while easily updating the coding position information. The transmitting unit may also in a simple way be provided with a new or amended computer program for the control thereof. The transmitting unit may further comprise a display member.

The invention also comprises a computer program used for executing processing of signals received by the detecting means in a transmitting unit according to the present invention as well as a use of a transmitting unit according to the invention in a military exercise of combat in an area including spaces substantially unreachable by a satellite-based navigating system, such as GPS.

Furthermore, the present invention relates to a simulation system for use in a military exercise of combat in an area including spaces substantially unreachable by a satellite-based navigating system for such a simulation system.

The above-noted embodiments and the details which follow below relate to features of the invention which may be freely exchanged and combined as desired to suit the prevailing conditions or specific application intended. Further features and advantages of the present invention appear from the following description.

BRIEF DESCRIPTION OF THE DRAWINGS

With reference to the appended drawings below follows a specific description of preferred embodiments of the invention.

In the drawings:

FIG. 4 is a view corresponding to FIG. 3 showing use of several transmitting units in a larger room of a building, and FIG. 5 is a schematic perspective view illustrating the possible use of transmitting units according to the present invention outdoors in an area close to the outer wall of a building.

DETAILED DESCRIPTION OF PREFERRED EMBODIMENTS OF THE INVENTION

Figure 1:
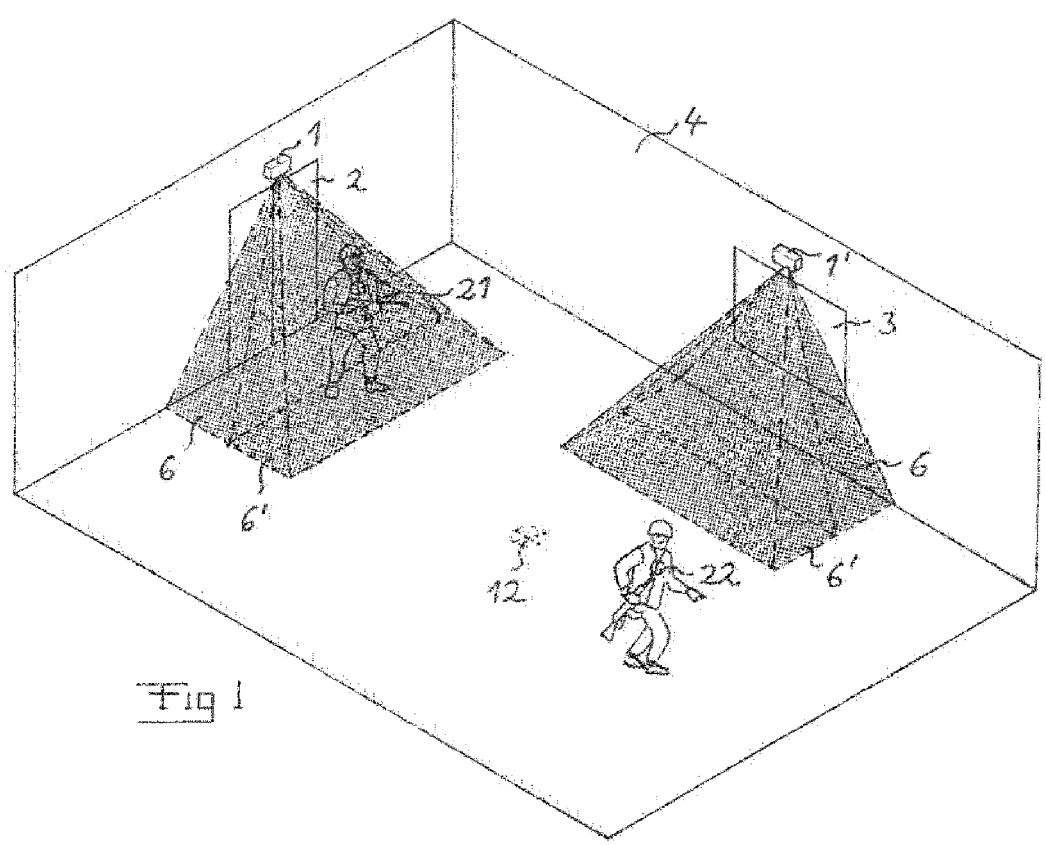
FIG. 1 is a schematic perspective view illustrating the application of transmitting units according to a first preferred embodiment of the invention in a room in a building.

A transmitting unit according to a first preferred embodiment of the invention will now be described while making reference simultaneously to FIGS. 1 and 2. Two such transmitting units 1, 1' are shown in FIG. 1 and there arranged directly above a door opening 2 and a window 3, respectively, of a room 4 in a building. Each transmitting unit comprises a detecting means adapted to detect movement of a person within a restricted predefined volume of the room 4. This detecting means comprises a Fresnel lens 5 designed to define such a restricted volume, and in the application shown in FIG. 1 this volume is defined by two curtain-like volumes 6, 6'. The transmitting units shown in FIG. 1 have each a detecting means defining a restricted volume by two such curtain-like volumes for detection.

The detecting means also comprises a member 7 adapted to sense infrared radiation, here of pyro-electric type. This member 7 may have for instance two or four detecting elements, so that signals obtained from this member 7 and sent further to means 8 for signal processing will have an appearance depending upon the direction of movement of a person crossing the restricted predefined volume 6, 6' for detection.

The means 8 will continuously be in an active state. The signal processing means 8 will amplify the signal from the detecting member 7 and compare it with a certain threshold and send an analogous 9 and a digital 10 movement signal to a processing device 11 for bringing this processing device from an inactive to an active state. The processing device 11 will analyse the analogous signal 9 for determining in which direction a person detected by the detecting member 7 is moving and thereby decide whether coded information about a position 12 close to the unit shall be transmitted by a transmitter 13 to be described further below or not. In some applications it may be sufficient to only process the digital signal.

When the processing device 11 decides that signals of such coded information are to be transmitted it sends a signal to an energy supplying source 14 for transferring this to an active state. An oscillator 15 and a pulse transmitter 16 provided with position information by the processing device 11 are also activated by this device. The pulse transmitter 16 activates in its turn the infrared transmitting diodes of the transmitter 13 provided with a sufficient voltage by the source 14, so that signals of coded information about the position 12 are transmitted by the transmitter 13. This transmission takes place through a beam shaping lens 17 for directing the infrared light within a restricted predefined volume of the space. The transmitter 13 and the detecting means are preferably matched so that the restricted predefined volumes of transmitting and detection substantially coincide.

The processing device 11 contains a computer program for the processing of detected signals and control of the transmitting of signals by the transmitter 13. The transmitting unit also comprises a wireless interface 18 schematically indicated for updating of coded position information and/or a computer program contained in the processing device 11. The presence of the detecting means may also be used for saving power in the processing device 11, which may have a normally completely inactive up-dating part to be woke up by detection of movement of a person close to the transmitting unit.

The transmitting unit further comprises a display member 19 adapted to display readable information about the position, such as house, flat and room in order to facilitate the deployment of the transmitting unit. It may also deliver information about the status of the transmitting unit.

Figure 2:
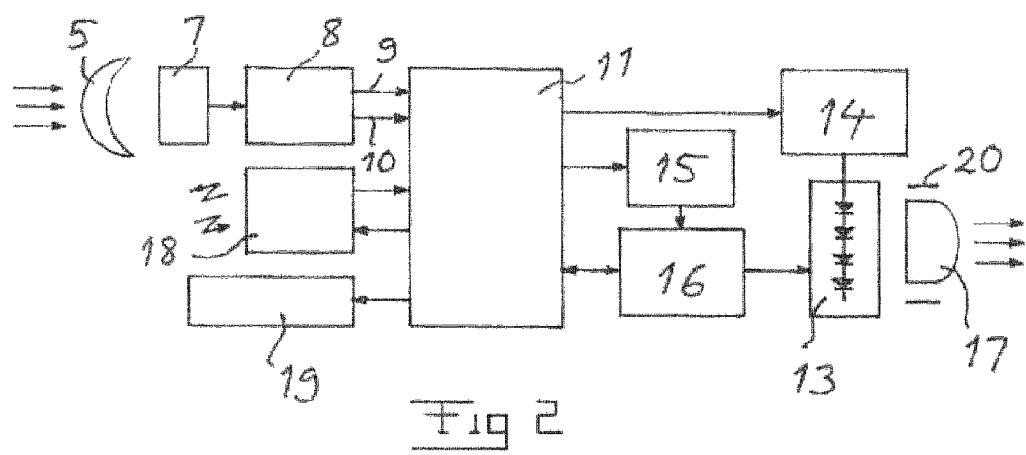
FIG. 2 is a schematic block diagram used to illustrate the function of a transmitting unit according to the present invention.

The transmitting unit also comprises mechanical means 20 schematically shown in FIG. 2 arranged around the transmitter 13 for shielding it.

The function of the transmitting unit according to the invention will in the application shown in FIG. 1 be as follows. The transmitter 13 together with the processing device 11, the energy supply source 14, the oscillator 15, and the pulse transmitter 16 is normally in an inactive state, and the detecting means is continuously detecting movement of persons within the restricted predefined volumes 6, 6' of the space. When a person 21 crosses this volume, for instance entering the room 4 through the door opening 2, the detecting means detect this, and the processing device 11 will decide to transmit signals of coded information about the position 12 within substantially the same volume 6, 6', since the detected direction of movement is into the room. These signals will be received by a receiver 22 arranged on the person, and this receiver 22 is preferably associated with a second transmitter not shown transmitting this position information further to a central for governing the military exercise of combat in which the person participates. The transmission by the transmitter of the transmitting unit 1 only last for a comparatively short period of time, in the order of a couple of milliseconds, and the parts 11, 13, 14, 15, 16 will then return to the inactive state of low power consumption. It is conceivable to repeat the transmission once or twice with an interval of for instance 0,5 sec after a movement has been detected, and the parts 11, 13, 14, 15 and 16 will return to the inactive state between such transmissions. If the person 21 should then run out through the door opening 2 the detecting means will detect this, but only the processing device will be activated, since this will recognize that the movement was out of the room and therefore no position information need to be transmitted by the transmitter 13. The intervals between two consecutive battery replacements in the transmitting unit may by this be easily prolonged 10-20 times with respect to such units already known.

When the person is moving in the room without crossing any volume 6, 6' no transmission by the transmitter 13 will take place. It is possible that the volume in front of the window is associated with one position and the one in front of the door opening with another position in the room. For instance in the case of such a position in front of a window it will be possible to consider the increased vulnerability of a person when present close to the window. The same considerations may be valid for a person close to a door opening or another opening in a room.

Figure 3:
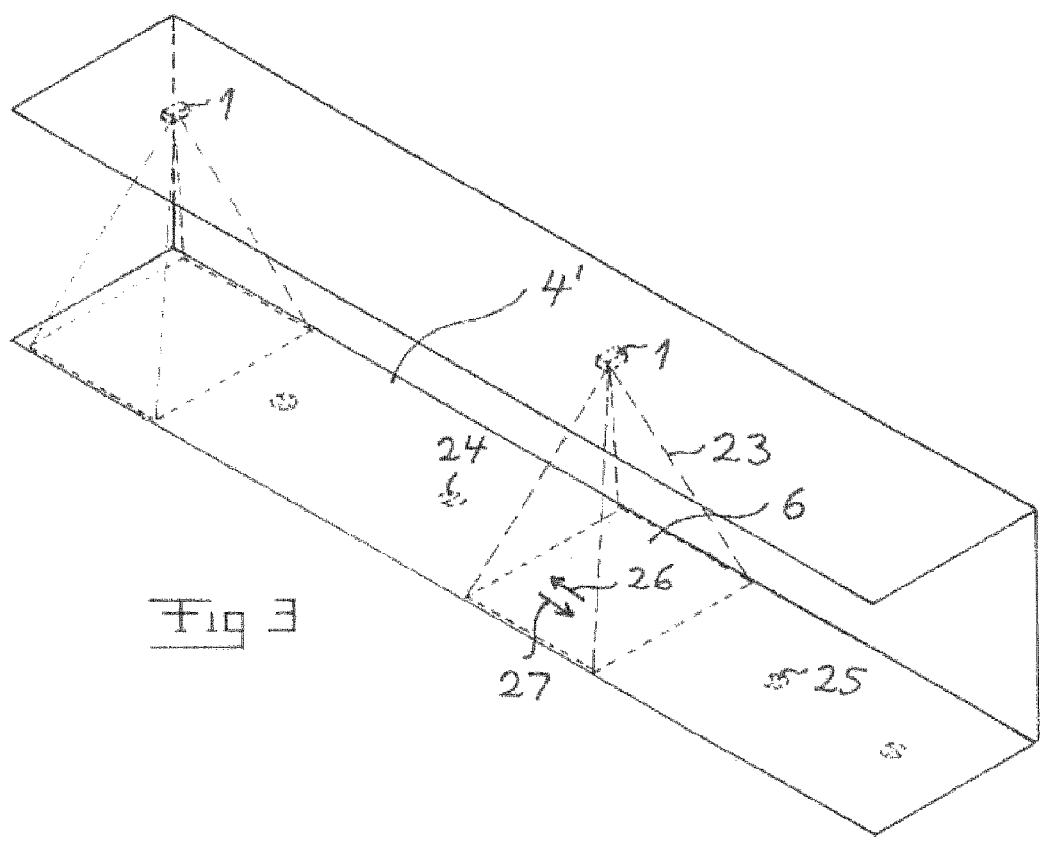
FIG. 3 is a schematic perspective view illustrating the use of transmitting units according to the present invention in a corridor.

It is shown in FIG. 3 how a plurality of transmitting units 1 according to the present invention may be arranged with intervals in an elongated room 4', such as a corridor, of a building. In this case the detecting means of each transmitting unit is adapted to cover substantially the entire width of the room by a restricted predefined volume for detection of movement, so that the room is divided into sectors as illustrated by the dashed lines 23 and a soldier may not pass from one sector to the other without crossing a restricted predefined detection volume. In this case each sector is provided with two separate pieces of position information belonging to different transmitting units. In this case the restricted predefined volume for detection and transmission will have a pyramid-like shape as shown through the dashed lines 23. Thanks to the possibility to determine in which direction a person is moving the direction of movement of a person entering the volume 6 will determine about which of the two positions 24 and 25 information will be transmitted to the receiver of that person, so that information about the position 24 will be transmitted when moving according to the arrow 26 and about the position 25 when moving according to the arrow 27.

FIG. 4 illustrates how a large number of transmitting units 1 according to the invention may be arranged in a larger room and associated with a position in that room each. This means a possibility to obtain knowledge about the position of a person in a room with a comparatively high accuracy. In this case it is possible that all the transmitters of the different transmitting units transmit the same code for the room with an addition of offset co-ordinates with respect to a certain position, such as the centre, of the room. This means that the receiver of a person then only needs one position, such as GPS position, and may then calculate the actual position more exactly.

FIG. 5 illustrates a further possible application of a transmitting unit according to the present invention. In this case a number of transmitting units 1 are arranged on the outer wall 28 of a building 33. It is shown how each detecting means and transmitter of a transmitting unit 1 covers small sector-like zones 29 for jointly covering the entire volume 6 indicated by the dashed lines. Thus, different positions 30-32 may be associated with a person 21 moving close to the building 33. Mechanical means for shielding the transmitter of the transmitting unit is particularly preferred in this application so as to reduce sun shine inciding towards the detecting means as well as shielding betraying infrared radiation transmitted by the transmitter towards the person. This means that it will be harder to detect by night vision goggles.

It is pointed out that "volume" as used in this disclosure, for instance in "restricted predefined volume", may consist of a plurality of smaller volumes, which do not have to form a continuous volume. The smaller volumes may have any shape, such as curtain-like, pyramid-like, cone-like etc.

The invention is of course not in any way restricted to the preferred embodiments thereof described above, but many possibilities to modifications thereof will be apparent to a person with ordinary skill in the art without departing from the basic idea of the invention as defined in the appended claims.

For example, in an extended embodiment each room 4 in a building is provided with a radio transmitter arranged to emit coded position information. The soldier equipment is then arranged to receive the position information both from the transmitters 1, 1' and the radio transmitter. If radio signals are received from more than one radio transmitter, the one transmitter is chosen having the strongest signal strength. In accordance with this extended embodiment, the following situations may be present.

1. There is a correspondence between the received position information from the transmitter 1 or 1' and the radio transmitter. In this case, the new position information is accepted.

2. There is not a correspondence between the received position information from the transmitter 1 or 1' and the radio transmitter. In this case, the latest accepted position information is maintained.

3. The position information is only received from the transmitter 1 or 1'. In this case the new position information received from the transmitter is accepted.

4. The position information is only received via radio. In this case the new position information received via radio is accepted.

In an alternate version to this extended embodiment only the radio transmitters generate the room specific codes and the transmitters 1, 1' only are used for indicate that the player has moved into another room.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmitting unit, comprising:
    a transmitter arranged to transmit signals of coded information about a position close to the unit in a space so as to provide a receiver arranged on a moving object, present in said space with position information for determining the position of said object, said transmitter being adapted to normally be in an inactive non-transmitting state; and
    a detector adapted to detect movement of said object within said space and to activate said transmitter to transmit said signals when a movement of said object in said space is detected, wherein said detector is adapted to detect movement of said object only within a restricted predefined volume of said space; and wherein said transmitter is activated only as long as movement within said predefined volume is detected.

2. The transmitting unit according to claim 1, wherein said transmitter is adapted to transmit said signals of coded information within the restricted predefined volume of said space.

3. The transmitting unit according to claim 2, wherein said transmitter and said detector are matched so that said restricted predefined volumes of transmitting and detection substantially coincide.

4. The transmitting unit according to claim 1, wherein said detector comprises a detecting member adapted to detect infrared radiation.

5. The transmitting unit according to claim 4, wherein said detecting member comprises a pyro-electric member.

6. The transmitting unit according to claim 1, wherein said detector comprises a Fresnel lens designed to define said restricted predefined volume of said space for detection by the detector.

7. The transmitting unit according to claim 1, wherein said detector is adapted to detect movement of said object within the restricted predefined volume of said space in the form of one or more curtain-like volumes.

8. The transmitting unit according to claim 1, wherein said detector is adapted to detect movement of said object within the restricted predefined volume of said space in the form of one or more pyramid shaped or cone shaped volumes diverging from a detecting member of said detector.

9. The transmitting unit according to claim 1, wherein said detector comprises a detecting member able to determine in which direction said object moves within said space.

10. The transmitting unit according to claim 9, further comprising:
a processing device adapted to receive a detection signal from said detecting member and control said transmitter depending on the character of said detection signal for making at least one of the following decisions a) and b) depending upon the detected direction of movement of said object:
a) about which of two or more positions signals of coded information is to be transmitted by the transmitter
b) whether the transmitter shall transmit signals of coded information or not.

11. The transmitting unit according to claim 1, wherein said transmitter is adapted to enter an inactive state after having transmitted a predetermined number of signals of coded information upon said detection of a movement of said object by said detector.

12. The transmitting unit according to claim 11, wherein said transmitter comprises an energy source supplying energy for the generation of said signals of coded information, wherein said energy source is normally in an inactive energy storing state and is adapted to be activated by a detection of a movement of said object by said detector for delivering energy for the generation of said signals of coded information.

13. The transmitting unit according to claim 1, wherein said transmitter comprises an arrangement of one or more lenses adapted to form a beam of transmitted signals defining a restricted predefined volume for said transmitting.

14. The transmitting unit according to claim 1, wherein the transmitter is adapted to transmit signals of coded information in the form of pulses of infrared light.

15. The transmitting unit according to claim 1, further comprising:
a mechanical shield arranged around said transmitter for shielding the transmitter.

16. The transmitting unit according to claim 1, further comprising:
a processor adapted to process signals detected by the detector and control the transmitting of signals by said transmitter, wherein said processor comprises a wireless interface for updating of said coded position information and/or a computer program contained therein.

17. The transmitting unit according to claim 1, further comprising:
a display member adapted to display readable information about said position.

18. A computer program product, comprising:
a computer readable medium; and
computer program recorded on the computer readable medium and executable by a computer or processor to execute processing of signals received by a detector in a transmitting unit to determine how to control said transmitter of the transmitting unit, wherein the transmitter unit comprises a transmitter arranged to transmit signals of coded information about a position in the vicinity of the unit in a space so as to provide a receiver arranged on a moving object, present in said space with position information for determining the position of said object, said transmitter being adapted to normally be in an inactive non-transmitting state; and a detector adapted to detect movement of said object within said space and to activate said transmitter to transmit said signals when a movement of said object in said space is detected, wherein said detector is adapted to detect movement of said object only within a restricted predefined volume of said space; and wherein said transmitter is activated only as long as movement within said predefined volume is detected.

19. A method of using a transmitting unit, the method comprising:
providing a transmitting unit comprising a transmitter arranged to transmit signals of coded information about a position in the vicinity of the unit in a space so as to provide a receiver arranged on a moving object, present in said space with position information for determining the position of said object, said transmitter being adapted to normally be in an inactive non-transmitting state; and a detector adapted to detect movement of said object within said space and to activate said transmitter to transmit said signals when a movement of said object in said space is detected, wherein said detector is adapted to detect movement of said object only within a restricted predefined volume of said space; and wherein said transmitter is activated only as long as movement within said predefined volume is detected; and
using said transmitting unit in a military exercise of combat in an area including spaces substantially unreachable by a satellite-based navigating system.

* * * * *